United States Patent [19]

Granryd

[11] Patent Number: 4,603,916
[45] Date of Patent: Aug. 5, 1986

[54] LIGHTWEIGHT RETRACTABLE TRACK-WHEEL FOR AGRICULTURAL TRACTORS AND THE LIKE

[76] Inventor: Thorvald G. Granryd, 1260 N. Western Ave., Lake Forest, Ill. 60045

[21] Appl. No.: 667,572

[22] Filed: Nov. 2, 1984

[51] Int. Cl.⁴ .................. B60B 15/12; B60B 15/06; A01B 33/02; A01B 63/02
[52] U.S. Cl. ................................ 301/45; 152/213 A; 172/116; 172/247; 180/9.26
[58] Field of Search ............... 152/208, 213 R, 213 A, 152/214, 225 R, 228; 301/44 T, 44 R, 46, 47, 41 R, 45, 49; 188/4 B, 4 R, 5, 6; 180/9.26, 119; 172/540, 545, 546, 521, 536, 549, 550, 552, 80, 105, 116, 121, 123, 247, 292

[56] References Cited

U.S. PATENT DOCUMENTS 2,394,995  2/1946  Guinn ................................ 301/46
4,508,150  4/1985  Granryd ..................... 152/225 R X Primary Examiner—Edward Kimlin
Assistant Examiner—Thomas Bokan
Attorney, Agent, or Firm—August E. Roehrig, Jr.

[57] ABSTRACT

A lightweight retractable track-wheel for obtaining less soil compaction and improved traction efficiency of rubber tired vehicles. The track-wheel provides high-strength, thin-gauged spade-lugs, rotatably secured to a main frame for providing higher drawbar pull at higher rate of travel speed by utilizing stronger sub-surface layer of soil; and includes an actuator for extending and retracting the traction spade-lugs for expedient and effortless conversion of the track-wheel to allow travel on pavement.

18 Claims, 6 Drawing Figures

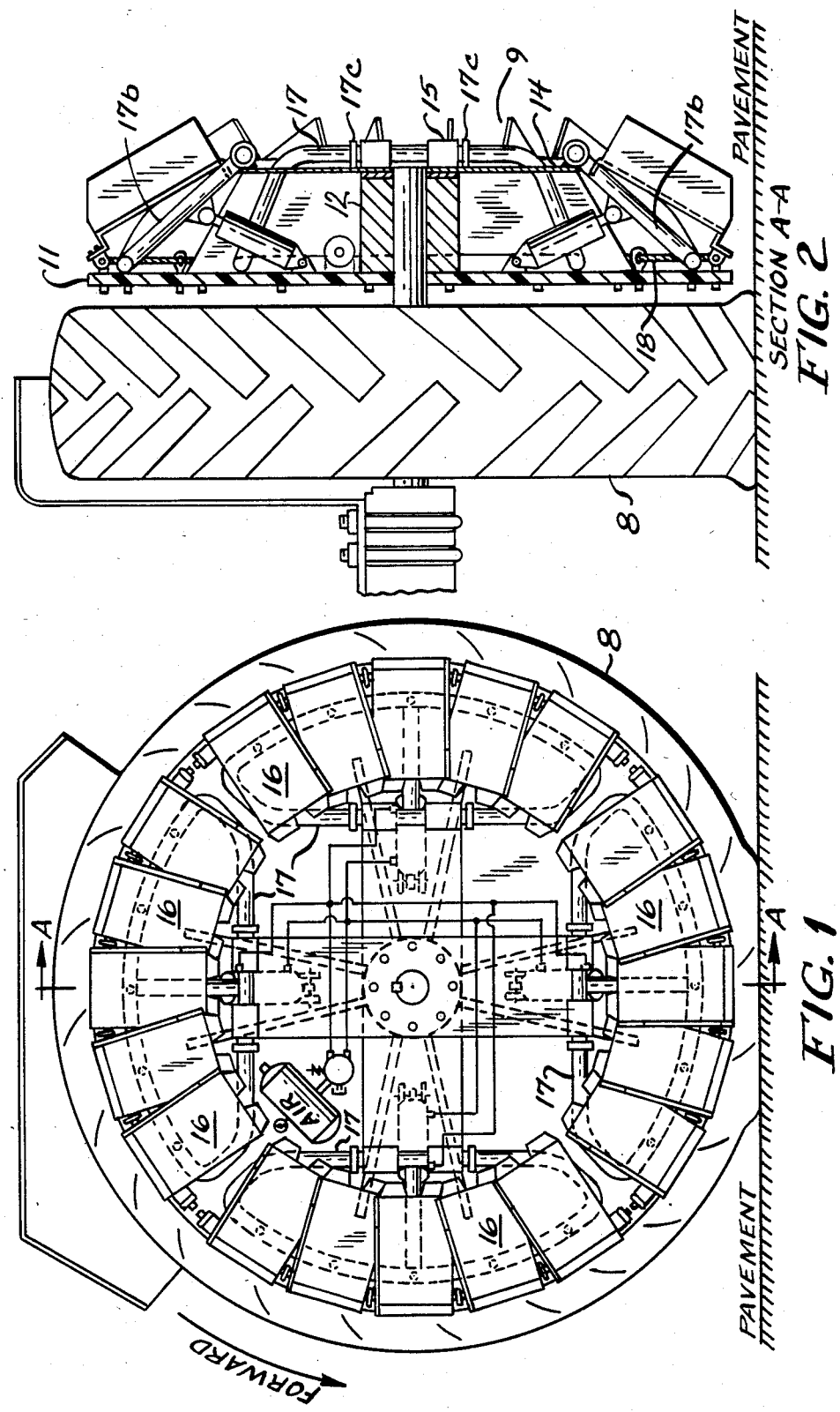

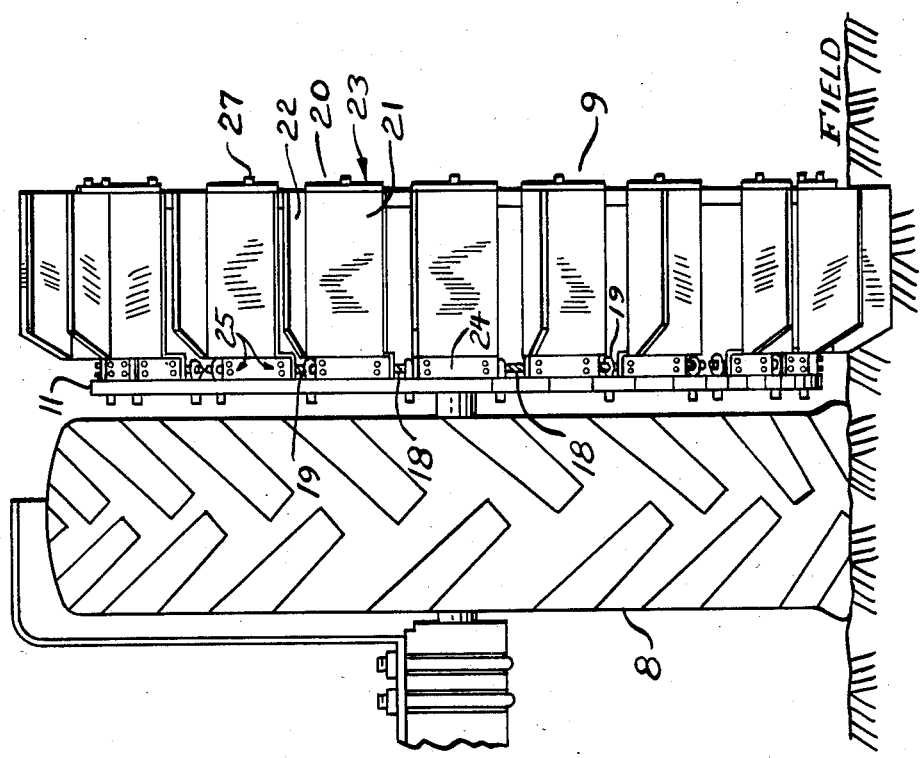
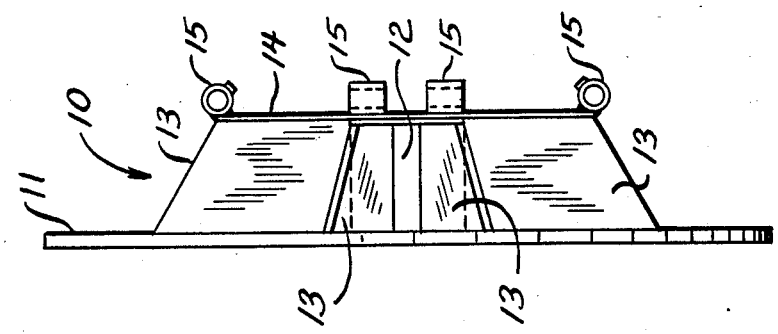
FIG. 5
FIG. 6

LIGHTWEIGHT RETRACTABLE TRACK-WHEEL FOR AGRICULTURAL TRACTORS AND THE LIKE

BACKGROUND OF THE INVENTION

This invention relates generally to an apparatus for improving traction efficiency and reducing soil compaction of agricultural wheeled tractors. Reference is made to U.S. Pat. Nos. 4,402,357 and 4,508,150 the disclosure of which is incorporated herein by reference. In both of these documents, the shortcomings of a pneumatic tire for a tractor's drive wheels are discussed.

As is noted in the above mentioned patent application, in the past few decades there has been a trend in the farm tractor industry toward larger, heavier and more powerful two-wheel drive tractor models as well as four-wheel drive type tractors. The reason for this evolution may be said to be two-fold: (a) to offset the inherently modest performance characteristics of agricultural drive tires in most field conditions in response to the market's demand for higher productivity; and (b) to compensate for increased resistance by the pulled implement which is caused by gradually more compacted soils.

In a publication entitled "Fighting World Hunger - Farm Productivity" (TRUCK & OFF-HIGHWAY INDUSTRIES, Sept. 1981), the farm tractor is singled out and, notably, attention is focused on the subject of traction and tire slippage. Industry experts are discussing monitoring wheel slip to automatically reduce wheel tractor slippage, and usage of dual wheels and front wheel assist as means for improvement.

In a recent paper entitled "Soil Compaction: An Increasingly Costly Problem" (published by ELANCO PRODUCTS COMPANY, Indianapolis with technical assistance from Purdue University), it is stated that ". . . (S)oil compaction is becoming an increasing problem . . . about 7.7 million of Indiana's 12 million acres of row cropland are susceptible to severe compaction . . . (I)n southern Michigan . . . excessive compaction was seen in 95 percent of the soybean fields and 90 percent of the corn fields surveyed!". And, on costliness of compaction: " . . . In 1982 corn experiments, Purdue University scientists showed that compaction reduced . . . yields by about 19 percent. Yields were 160 bushel per acre on non-compacted soil; only 130 bushels on compacted plots . . . Ohio scientists reported a 30-percent reduction in corn yields . . . Also in Illinois, Elanco Products Company researchers demonstrated a 60 percent yield reduction—from 159 bushels to only 96 bushels—due to compaction."

In addressing the issue as to why compaction is increasing, the tractor, again notably, is termed the main culprit. A photo of an articulated type tractor, having no less than twelve drive tires, is shown and it is stated: "Even with wider tires, heavier axle loads cause greater compaction." And, as to how compaction increase costs, it is stated: "Compacted soils are harder to till. Research in Illinois showed that 92 percent more power was required to plow a severely compacted soil. Larger more powerful tractors required to till compacted soils, in turn, cause more compaction. It's a costly cycle."

The findings reported in the above reference papers—said to be "published in the interest of better crop production"—serve to explain at least one reason for the need of bigger drawbar tractors on farms. If, for example, a 100 horsepower tractor was needed to plow a non-compacted field, then to plow the same field at equal tractor wheel speed when it has become severely compacted, it would require 192 horsepower, according to the research in the Illinois test. Further, at equal tractor wheel speed, the 92% more power required means 92% more vertical load on the drive wheels. This, in turn, adds to soil compaction—thus the "costly cycle."

To achieve this added vertical load on the drive wheels, the industry practice is to add ballast weight, either in the form of auxiliary cast-iron wheel weights or by means of a liquid solution carried within the drive tires. Typically, an agricultural drive tire will hold almost five times its empty weight in calcium chloride/water solution. The SAE (Society of Automotive Engineers) Recommended Practice J884c states that a 18.4-38 size tire, properly filled with $3\frac{1}{2}$ lb. $CaCl_2$ per gallon of water, means 1,113 lbs. of liquid ballast. This size tire, per se, generally weighs less than 250 pounds. From the photo referred to in the paper, total ballast weight may well approximate some 13,000 pounds for the twelve drive tires—thus the captioned " . . . heavier axle loads cause greater compaction."

The immediate foregoing relates to reason (b) in the above. In regard to reason (a), reference is made to a publication entitled "The Comparative Performance of Some Traction Aids" (P. H. Bailey, National Institute of Agricultural Engineering, Silsoe, England; JOURNAL OF AGRICULTURAL ENGINEERING RESEARCH, Vol. 1, No. 1, 1956). This study reports traction performance, i.e., wheel slippage, tractive force, rolling resistance and overall efficiency for a number of traction enhancing devices operating on various types of field and compared to bias-type pneumatic tire. Included in these tests were the spade-lug steel wheel of early tractors.

From the Bailey publication above, the following can be deduced, pertaining to operation on "wheat stubble on clay, surface moist, fairly wet and firm below". At point of maximum terra-dynamic efficiency for both tire and for steel wheel—both occurring at ten percent slippage—the Coefficient of Drawbar Pull, i.e., ratio of horizontal pull developed to vertical load imposed, was 0.25 for tire versus 0.53 for steel wheel. Thus, at equal weight on a tractor's drive wheels and at equal rate of wheel slippage, the tractor with steel wheels will provide 112 percent more drawbar pull (0.53/0.25=2.12) on this type of field condition, not atypical for Midwest and Western States in the U.S.

The reason for the steel wheel's higher Coefficient of Drawbar Pull stems from its sharp spade-lugs, as opposed to the much wider tire lugs of pneumatic agricultural drive tire. Thus, the steel wheel will penetrate into the sub-surface layer of soil, having higher soil values and thus more shear strength for developing thrust for propulsion.

The grousers of a track-type vehicle provide the same penetrating characteristics as do the spades of steel wheels of early tractors. The track of such track-type vehicles provide an additional favorable aspect of traction, namely, low ground pressure due to its substantial width and length, thus resulting in less soil compaction. Agricultural tractors, however, must have great mobility and be capable of travel on paved roads for maximum utility. Neither the track-type vehicles nor the steel-wheel type tractors fulfill this requirement.

SUMMARY OF THE INVENTION

It is, therefore, an object of the invention to improve traction efficiency for rubber tired vehicles.

It is another object to minimize soil compaction while operating on agricultural land.

It is a further object of the invention to enable the traction enhancing and compaction reducing system to be readily engaged and disengaged.

Yet a further object is to arrange for ready interchangeability of one traction enhancing and compaction reducer with another to permit an assortment of configurations to be utilized in response to various field conditions.

It is another object to achieve a traction enhancing and compaction reducing system which is lightweight.

DESCRIPTION OF THE DRAWINGS

Further objects of the invention, together with additional features contributing thereto and advantages accruing therefrom, will be apparent from the following description of the preferred embodiments of the invention, which are shown in the accompanying drawings with like numerals indicating corresponding parts throughout, wherein:

FIG. 1 shows a side profile view of the left conjunctive drive tire of a vehicle with the track-wheel mounted thereon in a retracted mode for operating on pavement;

FIG. 2 shows a front view of the drive tire shown in FIG. 1 with a cross section of the accompanying track-wheel in retracted mode for operating on pavement;

FIG. 5 illustrates a frontal planar view of a left conjunctive drive tire and accompanying track-wheel in an engaged mode for operating in a field; and FIG. 6 illustrates a frontal view of the main frame of the track-wheel.

DESCRIPTION OF THE PREFERRED EMBODIMENTS

Figure 4:
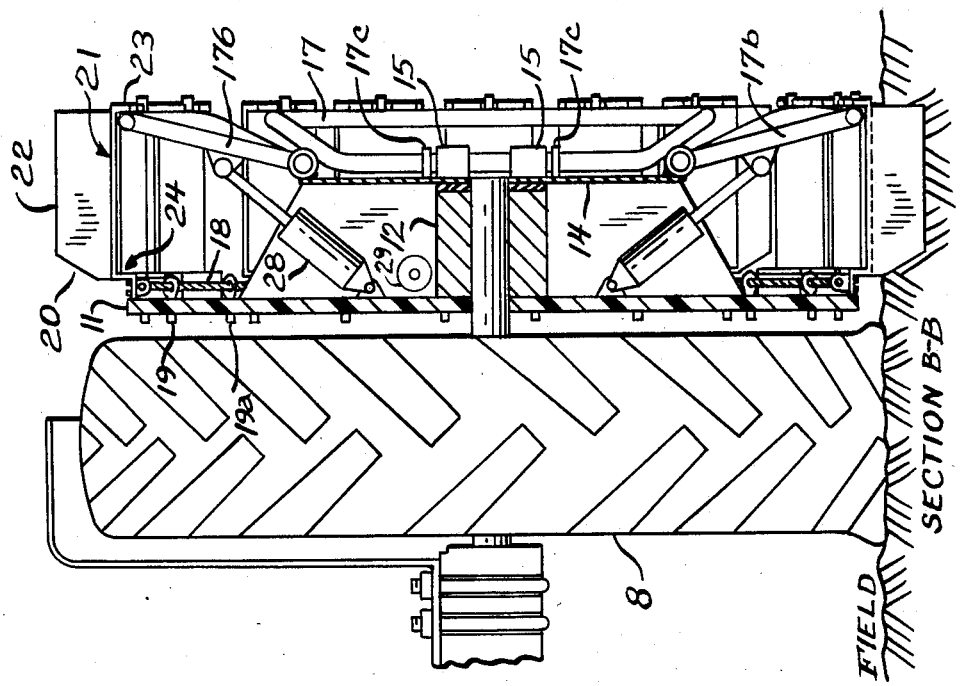
FIG. 4 illustrates the same view as FIG. 2 except with the track-wheel in an engaged mode for operating in a field.

Referring now to the drawings, there is shown a track-wheel 9 which operates in conjunction with an adjacent pneumatic drive tire 8. The track-wheel 9 comprises a main frame 10, to which are secured four alike component assemblies 16.

As best shown in FIG. 6, the main frame 10 comprises a circular-shaped, flat wheel disc 11, a hub 12 and eight alike ribs 13. These components are secured to form a rigid structure. Main frame 10 further includes a cross plate 14 secured to hub 12 and to ribs 13. Cross plate 14 has a pair of split-type steel tubes 15 welded onto each of its four ends, as shown.

Figure 3:
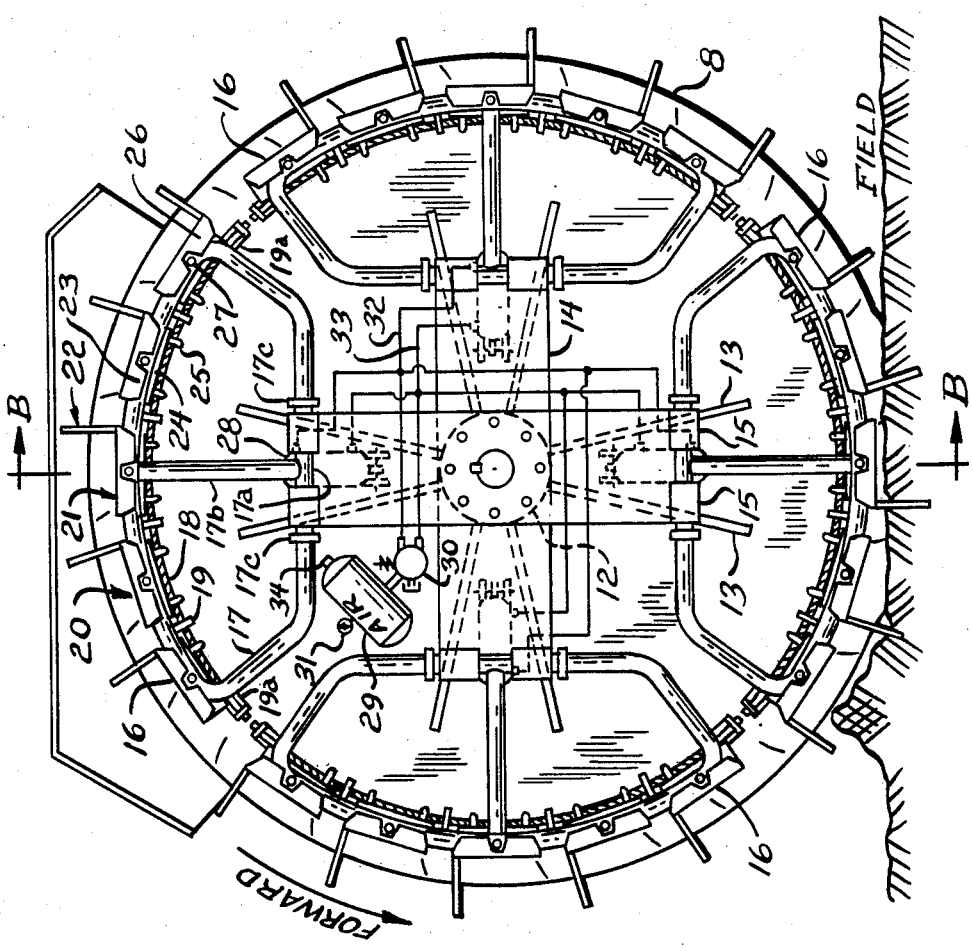
FIG. 3 illustrates the tire shown in FIG. 1 except with the track-wheel in an engaged mode for operating in a field.

Each of the four alike component assemblies 16 is best shown in FIG. 3. Each assembly 16 comprises a support bow 17 arcuately shaped at its outer periphery, and further shaped to form a closed loop by means of weld 17a along the chord of the arc. Also welded onto bow 17 are a strut 17b, joining the arc to its chord, two alike collars 17c, closing the chord, and five equally spaced studs 27 positioned along the arc. The assembly 16 further includes a piece of steel wire rope 18, rotatably mounted within six equally spaced anchor rings 19, secured to wheel disc 11 adjacent to the outer contour thereof, as shown. The piece of wire rope 18 is longitudinally secured by means of two stop rings 19a, one at each end. The assembly 16 further contains five alike steel spades 20, each rigidly secured to wire rope 18, each by means of two wire rope clips 25.

As best shown in FIGS. 4 and 5, the spades 20 have a base portion 21, a lug portion 22, an end portion 23 and a mounting portion 24. End portion 23 includes a slot 26, as shown in FIG. 3.

Materials for track-wheel 9 are chose as follows, to conform with the object of achieving a low weight. Disc 11 and ribs 13 are made of suitable plastic material, such as stress relieved high density polyethylene. Hub 12 and bow 17 are made from high strength steel tubing, such as a cold drawn seamless type. Cross plate 14 and spades 20 are made of ultra-high strength sheet steel, such as grade M190 Martinsite, manufactured by Inland Steel Company, in thickness of 0.060 inches and laminated from appropriate number of sheets by means of spot welding to obtain adequate and optimum strength.

As shown in FIGS. 1 through 4, each assembly 16 also includes a double-acting type cylinder 28, with its ends pivotally secured at one end to wheel disc 11 and at the other end to strut 17b.

Referring again to FIG. 3, each track-wheel 9 further includes an air reservoir 29, a control valve 30, an air pressure gauge 31 and air conduits 32 and 33. Conduits 32 and 33 couple valve 30 with each of the four air-type cylinders 28 in a parallel mode, whereby all of the cylinders 28 are actuated simultaneously. Reservoir 29 further has a one-way check valve/fitting 34, for charging and recharging from a compressed air supply.

Operation of track-wheel 9 is as follows.

FIGS. 1 and 2 show the device in its retracted mode—or in its "rubber-drive" configuration for traveling on pavement. In this mode, cylinders 28 are retracted. Each of the bows 17, rotatably mounted in tubes 15, is then folded inwards and rests against the wheel disc 11. As is described in the above-referenced U.S. Pat. No. 4,508,150, the wire rope 18 is twisted to be pre-stressed and spades 20 are pre-loaded upon assembly. Therefore, the spades 20 will follow bow 17, pressing against bow 17 automatically. As the base portion 21 of spades 20 is rectangular in shape, as they converge radially toward the center of the wheel, the base portions 21 of adjacent spades will overlap, as shown. As shown in FIG. 1, the spade design is such that there is space between each. It is to be noted that the spades 20 may also be designed so that the overlap is extended along the entire length of base portion 1. It is also to be noted in the overall design, that sufficient road clearance for wheel disc 11 and spades 20 is maintained to guard against possible low inflation pressure in conjunctive tire 8, and also the loss in tire rolling radius due to tractor bounce, etc.

FIGS. 3 and 4 show the device in its engaged mode—or in its "steel-drive" configuration for operating in fields. To attain this position for the spades 20, the control valve 30 is activated, causing the cylinders 28 to become extended. Each bow 17 thus rotates outwardly, with spades 20 pressing against it due to the pre-load, until stopped by means of end portion 23 of spades 20. With bows 17 in this position, spades 20 are essentially horizontal and together resemble a track chain of tracklaying vehicles, as shown in FIG. 5.

In this "steel-drive" mode, track-wheel 9 is subjected to potentially high loads, both in a vertical and in a tangential direction.

The vertical loads result from the weight on the drive wheels as well as from the tractor weight transferred in the course of pulling. This loading results in a compressive force upon bow 17 and strut 17b, which is transmitted into cross plate 14. It is to be noted that cylinders 28 are thereafter unloaded, as bows 17 have passed through an over-center position, in its arc between the retracted and engaged mode, as is seen in FIG. 4. Thus, the vertical load—in conjunction with the pre-load of spades 20—maintains bows 17 in a stable state. The unloading of cylinders 28 is achieved by providing a lost-motion mechanism, by means of an elongated-type support at one of the mounting ends, not shown in the drawings.

The tangential loads are caused, mainly, by drawbar pull of the tractor stemming from resistance at lug portion 22 of spades 20, as they penetrate the ground. Spades 20 are maintained in an essentially transverse attitude during tangential strain. This is accomplished as follows. Cross plate 14 functions as the driver of spades 20—as is wire rope 18. Each bow 17 is secured longitudinally, and tangentially, by means of collars 17c interlocking with split-type tubes 15, thus assuring that each of bow 17 also becomes a driver. The stud 27, protruding outwardly from bow 17 and positioned to match the slot 26 of end portion 23 of spade 20, thus provides the necessary second interlock.

Compressed air is the preferred power source for actuating the cylinders 28. An air compressor is at hand where rubber tired vehicles are serviced, and the available pressure is sufficient to overcome the pre-load and friction imposed by the five spades 20 per cylinder 28. Air reservoir 29 is recharged by connecting compressed air supply hose to fitting 34 of reservoir 29 and may be done while the tractor is being refueled. An air gauge 31 tells the state of the air charge. As is indicated from the symbol shown on the drawing, control valve 30 is of a solenoid-type. Preferably, the operation thereof is controlled remotely from the tractor's operator cab.

It is recognized that this simple and effortless method of conversion between the modes of operation may also be a safety hazard to a person standing nearby trackwheel 9, however. It is, therefore, contemplated that the control system is arranged to interlock with the tractor itself. In this way, cylinders 28 are actuated only when the vehicle is in motion by means of suitable sensing means coupled to the engine as well as to the transmission.

It is to be noted that as all eight of the cylinders 28 of the two track-wheels 9 are being extended simultaneously, at least two of the assemblies 16 will not come into proper position instantly. The cylinder force will not be sufficient to penetrate the spades 20 into the ground. Thus, the corresponding cylinders will stall at some partly extended position temporarily, until the wheels have rotated freeing these assemblies 16, at which time the cylinder stroke will become completed.

Employing plastic and ultra-high strength sheet steel for track-wheel 9 results in a lightweight device to reduce compaction of the soil. The here specified grade M190 for spades 20 has a minimum tensile strength of 190,000 psi. This high strength means that spades 20 may be constructed by laminating three sheets, each of only 0.060 inches in thickness, for a drawbar tractor of some 180 horsepower for a total thickness of a mere 3/16th of one inch. The M190 material also has the advantage of being low cost—according to the manufacturer, its "Cost/Strength Index" is about one fourth of that for ASI 1074 spring steel, which is an alternate material.

The resulting extraordinary thinness of lug portion 22 of spades 20 means that its penetrating capacity is correspondingly high. The width of a typical tire lug may be 3 inches. The comparative penetrating capacity is thus no less than 16-fold for spades 20, thereby making trackwheel 9 capable of penetrating the hardpan layer of soil at some considerably lesser amount of vertical load than with a tire lug.

Further, the flat and rectangularly shaped base portion 21 of spades 20 provides, much like a grouser of track-laying vehicles, an increased footprint area over that from a tire of equal width. This increase results in a lower ground pressure imposed by track-wheel 9.

Thus, three important features are achieved with track-wheel 9, namely, lesser weight, larger footprint area, and higher penetrating capacity, a combination which means that the tractor is pulling more efficiently at a lesser compaction of soil.

Additionally, it is to be noted that agricultural drawbar tractors encounter a variety of field conditions and kinds of applications. Accordingly, tire manufacturers typically furnish a broad line of tire configurations for such diverse use as rice farming, sugarcane farming or general farming. Similarly, for track-wheel 9—an assortment of spades 20 may be provided, having different dimensions for height of lug portion 22 or width or length of base portion 21. Changeover of spades 20 is done by loosening of the two wire rope clips 25 for spade 20, replacing with other spades 20 and re-tightening of clips 25.

Further, while the invention has been described in detail with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed in the drawings and specification as the best mode contemplated for carrying out this invention, but the invention will include all embodiments falling within the scope of the appended claims.

What is claimed is:

1. A retractable drive system for a rubber tired vehicle having a power driven tire and a driving member for the power driven tire, said retractable drive system comprising a frame having a first disc member, a second plate member and a hub operatively connected to said first and second members to form a rigid structure, said hub being adapted to be secured to a driving member of a power driven wheel, said first member including at least two series of anchor means for forming points of securement, said second member including at least two pivot means for forming a pivotal connection, at least two drive propulsion assemblies, each of said assemblies including a length of wire rope, said wire rope being mounted upon one of said at least two series of anchor means for rotational movement relative thereto, said drive propulsion assemblies also including a supporting member, said supporting member being mounted upon one of said at least two pivot means for rotational movement relative thereto, said drive propulsion assemblies further including a series of ground engaging spades mounted on said length of wire rope in a position to be movable between ground engaging and ground avoiding contact, each of said ground engaging spades having a lug portion, a base portion, a mounting portion and an end portion, coupling means for fixedly securing said mounting portion of each of said ground engaging spades onto said length of wire rope such that rotational movement of said wire rope will move said ground engaging spades between said ground engaging and ground avoiding contact, and actuating means for applying and retracting said series of ground engaging spades of said at least two drive propulsion assemblies.

2. The retractable drive system of claim 1, wherein the power driven tire has an overall-tire-diameter and said series of ground engaging spades have an applied-spade-diameter upon said actuating means being applied, and a retracted-spade-diameter upon said actuating means being retracted, said applied-spade-diameter exceeding said overall-tire-diameter and said overall-tire-diameter exceeding said retracted-spade-diameter.

3. The retractable drive system of claim 1, wherein each one of said lengths of wire rope is pre-formed in a pre-stressed configuration, thereby being angularly resistant to rotational movement when said lengths of wire rope are rotatably moved upon each of said at least two series of anchor means.

4. The retractable drive system of claim 1, wherein said base portion of each of said ground engaging spades exerts a force against said supporting member of each of said drive propulsion assemblies upon said lengths of pre-stressed wire rope being rotatably moved in one direction to a ground engaging position, and said base portion of each of said ground engaging spades exerting a force against said first member of said frame upon said lengths of pre-stressed wire rope being rotatably moved in the opposite direction into a ground avoiding position.

5. The retractable drive system of claim 1, wherein said frame further includes a power source, a control means and conduit means for activating said actuating means of each of said drive propulsion assemblies.

6. The retractable drive system of claim 5, wherein said power source comprises a pressure vessel containing compressed air.

7. The retractable drive system of claim 1, wherein said actuating means of each of said drive propulsion assemblies comprises a double-acting cylinder having a head end and a rod end.

8. The retractable drive system of claim 7, wherein said head end of said double-acting cylinder is pivotally mounted onto said first member of said frame, and said rod end of said double-acting cylinder is pivotally mounted onto said supporting member of said at least two drive propulsion assemblies.

9. The retractable drive system of claim 8, wherein said double-acting cylinder applies rotational movement to said supporting member for engaging said ground engaging spades, said base portion of said ground engaging spades exerts a force against said supporting member, said supporting member passes through an overcenter position relative to said pivot means, and said rotational movement is discontinued upon said supporting member encountering said end portion of each of said ground engaging spades, whereby said ground engaging spades are supported while in said ground engaged position.

10. The retractable drive system of claim 9, wherein one end of said double-acting cylinder has coupled thereto a lost-motion arrangement for facilitating said ground engaging spades being supported by said supporting member while in said ground engaged position and said double-acting cylinder means is unloaded.

11. The retractable drive system of claim 9, wherein each of said supporting members have a series of protrusions, said end portion of each of said ground engaging spades have a slot, and said protrusions are positioned such that each of said supporting member encounters an end portion of each of said ground engaging means, said protrusions engaging with said slot to thereby interlock said supporting member and said end portion of each of said ground engaging spades while in said ground engaged position.

12. The retractable drive system of claim 1, wherein said coupling means includes U-shaped fasteners and, wherein said mounting portion of each of said ground engaging spades includes two openings coinciding with said U-shaped fasteners for securing said mounting portion of said ground engaging spades onto each of said length of wire rope.

13. The retractable drive system of claim 12, wherein said ground engaging spades are formed from high-strength thin-gauged steel.

14. The retractable drive system of claim 13, wherein said ground engaging spades are formed from two or more sheets of said high-strength thin-gauged steel and, wherein said two or more sheets of high-strength thin-gauged steel being spot-welded to one another, thereby providing a laminate.

15. The retractable drive system of claim 1, wherein said second member of said main frame is formed from laminate of high-strength thin-gauged steel.

16. The retractable drive system of claim 1, wherein said first member of said frame is formed from plastic material.

17. The retractable drive system of claim 1, wherein said hub means of said frame is made of steel.

18. The retractable drive system of claim 1, wherein said supporting member of each of said at least two drive propulsion systems is formed from high-strength steel tubing.

* * * * *